ized Patent [19]

United States Patent [19]

Abbringh

[11] Patent Number: 4,837,500
[45] Date of Patent: Jun. 6, 1989

[54] CAPACITIVE DISPLACEMENT METER OR TRANSDUCER

[75] Inventor: Johannes F. Abbringh, Groningen, Netherlands

[73] Assignee: Schut's Im- & Exporthandel B.V., Groningen, Netherlands

[21] Appl. No.: 181,187

[22] Filed: Apr. 13, 1988

[51] Int. Cl.⁴ ............................................. G01R 27/26
[52] U.S. Cl. ................................. 324/61 R; 324/61 P
[58] Field of Search ......................... 324/61 R, 61 P; 340/870.37; 361/181

[56] References Cited

U.S. PATENT DOCUMENTS

| | | | |
|---|---|---|---|
| 3,210,539 | 10/1965 | Malaquin | 246/249 |
| 3,566,222 | 2/1971 | Wolfendale | 317/246 |
| 3,570,003 | 3/1971 | West | 317/246 |
| 3,812,424 | 5/1974 | Abbe | 324/61 R |
| 4,052,665 | 10/1977 | Gruenwald | 324/61 R |
| 4,206,401 | 6/1980 | Meyer | 340/870.37 |
| 4,303,919 | 12/1981 | Dimeff | 340/870.37 |
| 4,584,885 | 4/1986 | Cadwell | 73/862.61 |

FOREIGN PATENT DOCUMENTS 2267620 11/1975 France .
937831 1/1960 United Kingdom .

*Primary Examiner*—Reinhard J. Eisenzopf
*Assistant Examiner*—Maura K. Regan
*Attorney, Agent, or Firm*—Gottlieb, Rackman & Reisman

[57] ABSTRACT

A capacitive displacement meter or transducer of coaxial set-up is disclosed. At least one cylindrical inner electrode element is placed coaxially within at least one cylindrical hollow outer electrode element. The inner and outer electrode elements are coaxially movable relatively to each other. One electrode element comprises three axially spaced and aligned, cylindrical electrodes, of which the end electrodes are equally long and the intermediate middle electrode is shorter than the end electrodes. The other electrode element comprises at least one electrode extending coaxially relatively to the electrodes of said one electrode element and, in an inoperative position, being symmetrically juxtaposed to the middle electrode. The middle electrode and the two end electrodes are each provided with terminals.

23 Claims, 2 Drawing Sheets

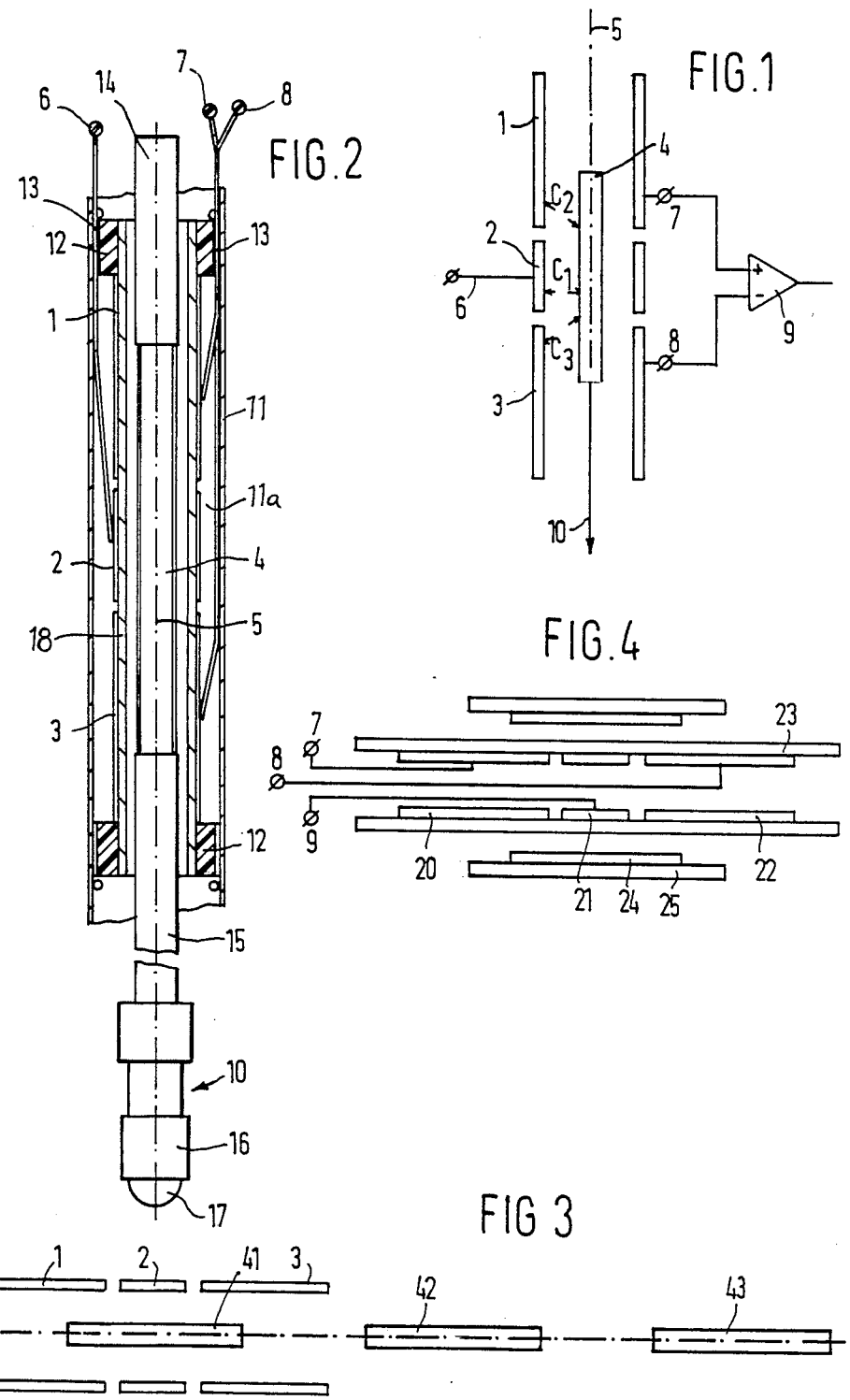

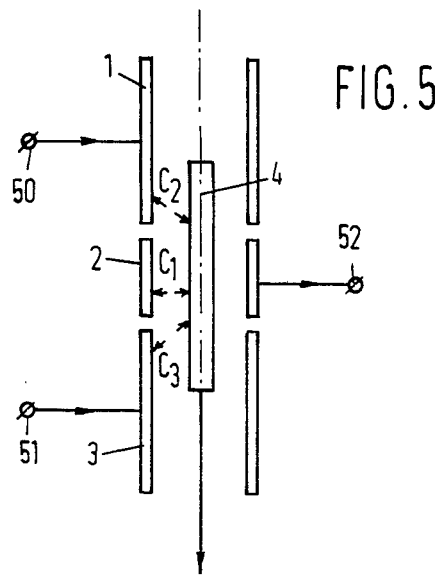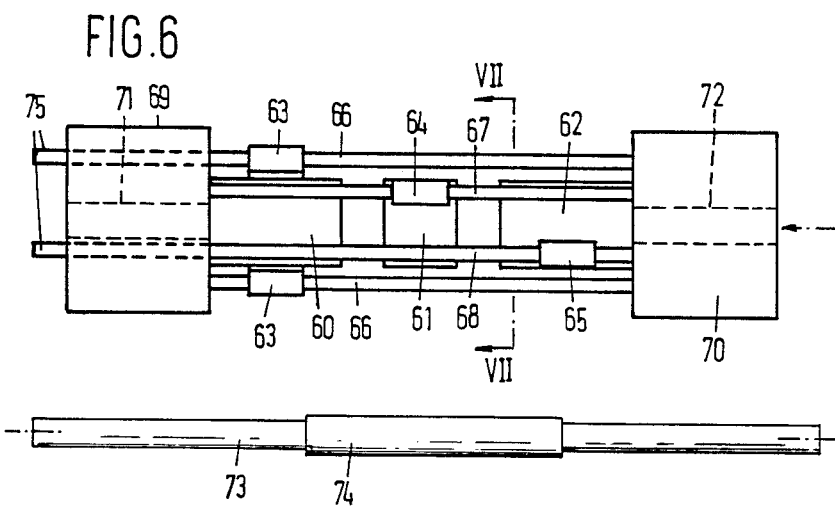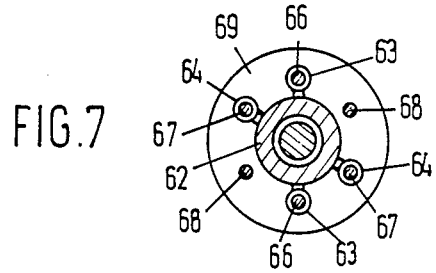

CAPACITIVE DISPLACEMENT METER OR TRANSDUCER

This invention relates to a capacitive displacement meter or transducer of co-axial set-up, comprising at least one cylindrical, hollow, outer electrode element and at least one cylindrical inner electrode element disposed coaxially within said at least one hollow element, said inner and outer electrode elements being co-axially movable relatively to each other.

A similar meter is disclosed in Dutch patent application No. NL-A-6902182 and can be used, for example, to replace the well-known mechanical micrometer. The known meter comprises two spaced, aligned hollow tubes which, in operation, carry different electric voltages. At the level of the gap between the facing edges of the hollow tubes, a cylindrical electrode is disposed for coaxial movement within the hollow tubes. The voltages prevailing on the electrode is a measure for its position relative to the two hollow tubes. This voltage can be measured through an electric wire connected to the movable electrode.

One disadvantage of the prior meter is that, owing to the use of different voltages on the hollow tubes, this instrument is electrically non-symmetrical, as a result of which the effects of spurious signals are relatively difficult to eliminate. Another disadvantage is that the prior meter has a moving connecting wire for the movable electrode. Owing to the occurrence of friction and/or mechanical tensions, this wire can hinder and/or delay the movement of the movable electrode somewhat, as a consequence of which the accuracy of the instrument is adversely affected. Furthermore, there is the risk of wire breakage owing to fatigue or the risk of deterioration of the electrical contact between the wire and the movable electrode after a given service period, which also affects the accuracy of the instrument.

It is an object of the present invention to overcome the disadvantages outlined above and, in general, to provide a sturdy, reliable and accurate displacement meter. The invention accordingly provides a meter of the above kind, which is characterized in that one electrode element comprises three axially spaced and aligned, cylindrical electrodes, of which the end electrodes are equally long and the intermediate middle electrode is shorter than the two end electrodes; that the other electrode element comprises at least one electrode extending coaxially relatively to the electrodes of said one electrode element and, in an inoperative position, is symmetrically juxtaposed to the middle electrode; and that the middle electrode and the two end electrodes are each provided with terminals.

The invention will be described in more detail hereinafter with reference to the accompanying drawings. In said drawings, FIG. 1 shows, diagrammatically, one embodiment of a meter according to the invention in axial cross-section;

FIG. 2 is a more detailed view of an example of a meter according to the present invention;

FIG. 3 shows a modification of a meter according to the invention;

FIG. 4 shows a second modification of a meter according to the invention;

FIG. 5 shows, diagrammatically, a variant of the instrument of FIG. 1; and

FIG. 6 and FIG. 7 illustrate in side-elevational view and in cross-sectional view, respectively, a practical embodiment of a meter as illustrated in FIG. 5.

FIG. 1 diagrammatically shows, in axial cross-sectional view, an example of a capacitive coaxial displacement meter according to the invention. The instrument shown comprises three hollow tubular electrodes 1, 2 and 3 which are in axial alignment with each other and have the same diameter. The two tubular end electrodes 1 and 3 are preferably equally long, and the middle electrode 2 located intermediate the tubular end electrodes is shorter than each of the end electrodes.

Placed coaxially within the combination of tubular electrodes is a central cylindrical electrode 4. The central electrode can move along the common axis 5, but in the inoperative position is at the level of the middle electrode 2. The central electrode is, however, considerably longer than the middle electrode and accordingly also extends some distance into the two tubular end electrodes. Accordingly, the central electrode forms a coaxial capacitor with each of the tubular end electrodes and with the middle electrode. By coaxial displacement of the central electrode, the capacitive values $C_2$ and $C_3$ of the respective capacitors formed by the central electrode with the tubular end electrodes are changed, as the size of the opposing surfaces is changed. The capacitive value $C_1$ of the capacitor formed by the central electrode and the middle tubular electrode 2 is not changed, however, at any rate so long as the central electrode is still within the region of the middle tubular electrode, which is the case with normal use.

According to the present invention, the position of the central electrode along the axis 5 can be accurately determined by applying to the middle tubular electrode an a.c. input voltage and determining the signal differential between the signals appearing at the two tubular end electrodes. For this purpose, the middle tubular electrode is provided with a terminal 6 for a source of a.c. voltage, and the end electrodes 1 and 3 are each provided with a terminal 7, 8, respectively, for wires connected to the inputs of a differential amplifier 9. In the example shown, the electrode 1 is connected to the positive input of the differential amplifier, and electrode 3 is connected to the negative input of the differential amplifier.

Furthermore, the central electrode is provided with a sensor 10 which when the instrument is in use determines the position of the central electrode.

The operation of the instrument is as follows. The a.c. input voltage, which for example may be a normal sinusoidal voltage, causes a signal to appear at the central electrode. This signal in turn causes a signal on both the one tubular electrode 1 and the other tubular electrode 3. The signal at terminal 7 is determined by $C_1$ and $C_2$, and the signal at terminal 8 is determined by $C_1$ and $C_3$. Assuming that the central electrode does not leave the region of the middle tubular electrode 2, the capacitor formed by the central electrode and the middle tubular electrode is not changed, and $C_1$ remains constant.

When the central electrode moves along the axis 5, the physical configurations of the capacitors formed by the central electrode with the two outer electrodes 1 and 3 are changed, so that $C_2$ and $C_3$ are varied, too. The signal appearing at each of the terminals 7 or 8, therefore, is already a measure for the position of the central electrode. In principle, therefore, it would be sufficient to have a single tubular end electrode. The use of two outer electrodes on opposite sides of the middle electrode, however, offers the advantage that a differential measurement can be used, so that spurious signals, as far as appearing to the same extent at both tubular end electrodes, can be effectively eliminated.

The output signal from the differential amplifier 9 is therefore an accurate measure for the position of the central electrode relative to a selected reference position, and hence, a measure for the distance through which the sensor 10 has displaced the central electrode relative to the reference position.

The selected reference position could, for example, be the position shown, in which $C_2$ and $C_3$ are equal, so that the output signal from the differential amplifier is zero.

When the central electrode has moved so far upwards that it can only cooperate with electrodes 1 and 2, the output signal from the differential amplifier 9 is similar to the input signal. If, however, the central electrode can only cooperate with electrodes 2 and 3, the output signal from the differential amplifier is similar to the inverted input signal.

FIG. 2 shows a more detailed longitudinal sectional view of an instrument according to the invention. Corresponding parts are designated by the same reference numerals in FIGS. 1 and 2. In the embodiment of FIG. 2, the basic configuration shown in FIG. 1, except for the differential amplifier, is mounted in a tubular casing 11, which is preferably made of metal and then also serves as an electric guard. The tubular electrodes 1–3 are positioned within the casing 11 by means of a plurality of positioning rings 12 of insulating material, and fixed in known manner.

The tubular electrodes 1–3 leave a free space 11a, between them and the casing, in which the connecting wires for the tubular electrodes extend. Where necessary, positioning rings 12 are provided with cut-outs for the passage of these wires, as shown diagrammatically at 13.

In the example shown in FIG. 2, the central electrode 4 is provided at both ends with a cylindrical extension 14, 15, respectively, of insulating material. These extensions can serve to guide the central electrode during movements caused by the sensor 10 provided at at least one of the extensions. In this example, sensor 10 comprises a ball 17 of tungsten carbide placed in a holder 16.

The three outer electrodes are arranged on the outer wall of a tubular carrier 18 of a suitable insulating material. This carrier accordingly also forms at least partly the dielectric between the central electrode and each of the outer electrodes.

This set-up has the advantage that the connecting wires for the outer electrodes can be placed in position in a simple manner. In principle, however, the outer electrodes could also be arranged on the inner wall of a tubular carrier. In that case, however, the carrier should be provided with holes for the passage of the connecting wires and securing these in position.

It is noted that, instead of a singular central electrode, it would be possible to use a multiple central electrode comprising a plurality of spaced aligned component electrodes. In this way an electronic ruler can be made. The principle is shown in FIG. 3. The central electrode 41 corresponds to the central electrode 4 in FIGS. 1 and 2. In alignment with the central electrode 41, however, some additional electrodes 42, 43 are provided which, in the condition shown, are outside the operational region of electrodes 1–3. The distance between the successive central electrodes has been so selected that, as soon as (during movement to the left in the drawing) electrode 41 has left the operational region of one of the outer electrodes, the next central electrode 42 enters this operational region. In this way, during coaxial movement of the successive central electrodes relative to the tubular electrodes 1–3, successive signal cycles are formed. By counting the number of cycles and further accurately determining the initial and end positions of the then-active central electrodes, the total distance through which the central electrodes have moved can be determined. As we are concerned here with relative movements, it is of course equally possible to keep the central electrodes stationary and move the tubular electrodes.

It is further noted that the meter shown can in principle be set up "inside out", as shown diagrammatically in FIG. 4.

In FIG. 4, the three tubular electrodes of FIGS. 1 and 2 are designated by 20 to 22, and they are now used as central electrodes arranged on the inner wall of a hollow tubular insulating carrier 23. The connecting wires extend within the tubular electrodes. It is also possible for the tubular electrodes to be arranged on the outside of a cylindrical carrier, for example, by first securing the connecting wires and then filling the tubular electrodes with a suitable material.

At the region of the middle tubular electrode 21, a wider tubular electrode 24 is provided around the combination of the three tubular electrodes, which electrode 24 may be mounted on a carrier 25. The wide electrode 24 performs, in electric respect, the same role as does the central electrode 4 in FIGS. 1 and 2. The carrier 23 or the carrier 25 may be provided with a sensor not shown.

Furthermore, similarly to the arrangement of FIG. 3, a series of spaced aligned electrodes can be used, which successively enter the operational region of the tubular electrodes 20–22. FIG. 5 diagrammatically shows a variant of the instrument shown in FIG. 1. The instrument shown in FIG. 5 differs from that shown in FIG. 1 in that the input signals are now applied to the two tubular end electrodes through terminals 50 and 51, respectively, while the signal to be measured is provided through a terminal 52 of the middle tubular electrode. Advantageously, the input signals applied to terminals 50 and 51 are a.c. voltages having the same amplitude, but shifted in phase relatively to each other through 180°. The output signal at terminal 52 then equals zero volt in the middle position of the central electrode. One advantage of this way of wiring is that the results of the measurement are less affected by an amplifier connected to the output.

FIG. 6 diagrammatically shows, in side-elevational view, a practical embodiment of a meter according to the invention and FIG. 7 shows a cross-sectional view taken on the line VII—VII of FIG. 6. In FIGS. 6 and 7, the housing of the instrument has been omitted, and so has the actual sensor.

FIG. 6 again shows three aligned tubular electrodes 60, 61 and 62. Each of the electrodes is secured by means of a plurality of suitable lugs 63, 64 and 65 to rods or bars 66, 67 and 68 extending longitudinally of the instrument. The ends of the rods are secured in insulating end disks 69 and 70. The end disks are provided with central bores 71 and 72, which are in alignment with each other and serve as a guide of a rod-shaped carrier 73 of the central electrode 74, which for the sake of clearness is shown separately in FIG. 6. Carrier 73 may be made of glass or a ceramic material or a suitable synthetic plastics. This also applies to the end disks 69 and 70.

Lugs 63–65 may consist of metallic tubular sections secured to the tubular electrodes. In the example shown, each tubular electrode has two diametrically opposed tubular sections slipped on corresponding rods or bars. Accordingly, as shown in FIG. 7, there is a total of six rods.

Advantageously, the rods are made of metal and they also serve as the wiring for the electrodes. For this purpose the end of at least one of the rods associated with each electrode is passed through one of the end disks to form a suitable electric connection, as shown at 75 in FIG. 6.

One advantage of such a construction is that the wiring is fully symmetrical and extends along all electrodes. The effect of possible parasitic capacities is thus equal for all electrodes. In addition, a separate carrier for the tubular electrodes is unnecessary, so that the only dielectric present between the electrodes is air. Advantageously, the lugs are movable over the rods, to enable accurate setting and possible adjustment. It is noted that, after reading the above, various modifications will readily occur to those skilled in the art. Thus each electrode of FIG. 6, for example, may have three lugs, so that the total number of rods becomes nine. Also, special means may be provided, such as a lock screw, to fix at least one lug of an electrode on a rod. Such modifications are deemed to fall within the scope of the present invention.

I claim:

1. In a capacitive displacement meter or transducer of co-axial set-up which includes at least one cylindrical, hollow, outer electrode element and at least one cylindrical inner electrode element disposed coaxially within said at least one outer electrode element, and in which said inner and outer electrode elements are coaxially movable relatively to each other;
   the improvement comprising that:
   (a) one of said inner and outer electrode elements comprises three axially spaced and aligned, cylindrical electrodes, of which the two end electrodes are of equal length and the intermediate middle electrode is shorter than each of said end electrodes;
   (b) the other of said inner and outer electrode elements comprises at least one electrode extending coaxially relatively to said three electrodes of said one electrode element and, in an inoperative position, is symmetrically juxtaposed to said middle electrode; and
   (c) said middle electrode and said two end electrodes of said one electrode element are provided with respective terminals.

2. A meter or transducer as claimed in claim 1, wherein said middle electrode is provided with a terminal for an input signal and said two end electrodes are each provided with a terminal for one of the inputs of a differential amplifier.

3. A meter or transducer as claimed in claim 1, wherein said middle electrode is provided with a terminal for an output signal, and said two end electrodes are each provided with a terminal for an a.c. voltage, with one a.c. voltage being opposite in phase to the other a.c. voltage and the two a.c. voltages being of equal amplitude.

4. A meter or transducer as claimed in claim 1, wherein said three aligned electrodes are hollow tubular electrodes, and at least one central cylindrical electrode is placed coaxially within said tubular electrodes.

5. A meter or transducer as claimed in claim 4, wherein said central cylindrical electrode is provided at at least one end with a projection extending beyond said tubular electrodes and carrying a sensor.

6. A meter or transducer as claimed in claim 4, wherein at least one further cylindrical electrode is disposed in alignment with, and spaced from, the central cylindrical electrode and is arranged, during movement of the central electrode relative to the three tubular electrodes, to enter the effective operational region of the three tubular electrodes as soon as the central cylindrical electrode leaves this region.

7. A meter or transducer as claimed in claim 4, wherein an insulating tubular carrier carries said three tubular electrodes on its wall.

8. A meter or transducer as claimed in claim 7, wherein said three tubular electrodes are arranged on the outer surface of said tubular carrier.

9. A meter or transducer as claimed in claim 1, wherein said outer electrode element is mounted in a cylindrical casing by means of insulating positioning rings.

10. A meter or transducer as claimed in claim 9, wherein said casing is made of electrically conductive material and serves as an electrical guard.

11. A meter or transducer as claimed in claim 9, wherein said three aligned electrodes are hollow tubular electrodes, and at least one of said positioning rings has at least one cut-out for the passage of connectors for said three tubular electrodes.

12. A meter or transducer as claimed in claim 1, wherein said three aligned electrodes constitute said inner electrode element and are disposed coaxially within at least one tubular electrode constituting said outer electrode element, and said at least one tubular electrode is symmetrically juxtaposed to the middle one of said aligned electrodes in the inoperative position.

13. A meter or transducer as claimed in claim 12, wherein at least one further tubular electrode is disposed in alignment with, and spaced from, said at least one tubular electrode and is arranged, during relative movement between said tubular electrodes and said three aligned electrodes, to enter the effective operational region of said three aligned electrodes as soon as said at least one tubular electrode leaves this region.

14. A meter or transducer as claimed in claim 12, wherein an insulating tubular carrier carries said at least one tubular electrode on a wall thereof.

15. A meter or transducer as claimed in claim 12, wherein said at least one tubular electrode is arranged on the inner surface of said tubular carrier.

16. A meter or transducer as claimed in claim 12, wherein the three aligned electrodes are tubular and the connecting wires for the three electrodes extend through the same.

17. A meter or transducer as claimed in claim 16, wherein said three aligned tubular electrodes are filled with an insulating material.

18. A meter or transducer as claimed in claim 16, wherein said three aligned tubular electrodes are arranged on the inner wall of an insulating tubular carrier.

19. A meter or transducer as claimed in claim 4, wherein two spaced insulating disks, each having a central bore therein, are disposed for guiding a cylindrical carrier of said central cylindrical electrode, each of said tubular electrodes is provided with at least one outward lug, and a plurality of rods extend between said insulating disks, each rod extending through a respective lug of one of said tubular electrodes.

20. A meter or transducer as claimed in claim 19, wherein at least one of the lugs of a tubular electrode is provided with means for securing the lug to the rod cooperating therewith.

21. A meter or transducer as claimed in claim 19, wherein each tubular electrode is provided with, and is attached to associated rods by, at least two lugs.

22. A meter or transducer as claimed in claim 21, wherein the rods are electrically conducting and the lugs form an electrical connection with the corresponding tubular electrodes.

23. A meter or transducer as claimed in claim 22, wherein at least one of the rods associated with each cylindrical electrode is passed to the outside through one of said insulating disks to form an electric terminal.

* * * * *